April 17, 1934.    A. U. SÄRNMARK    1,955,345
ABSORPTION REFRIGERATING MACHINE
Filed May 12, 1931
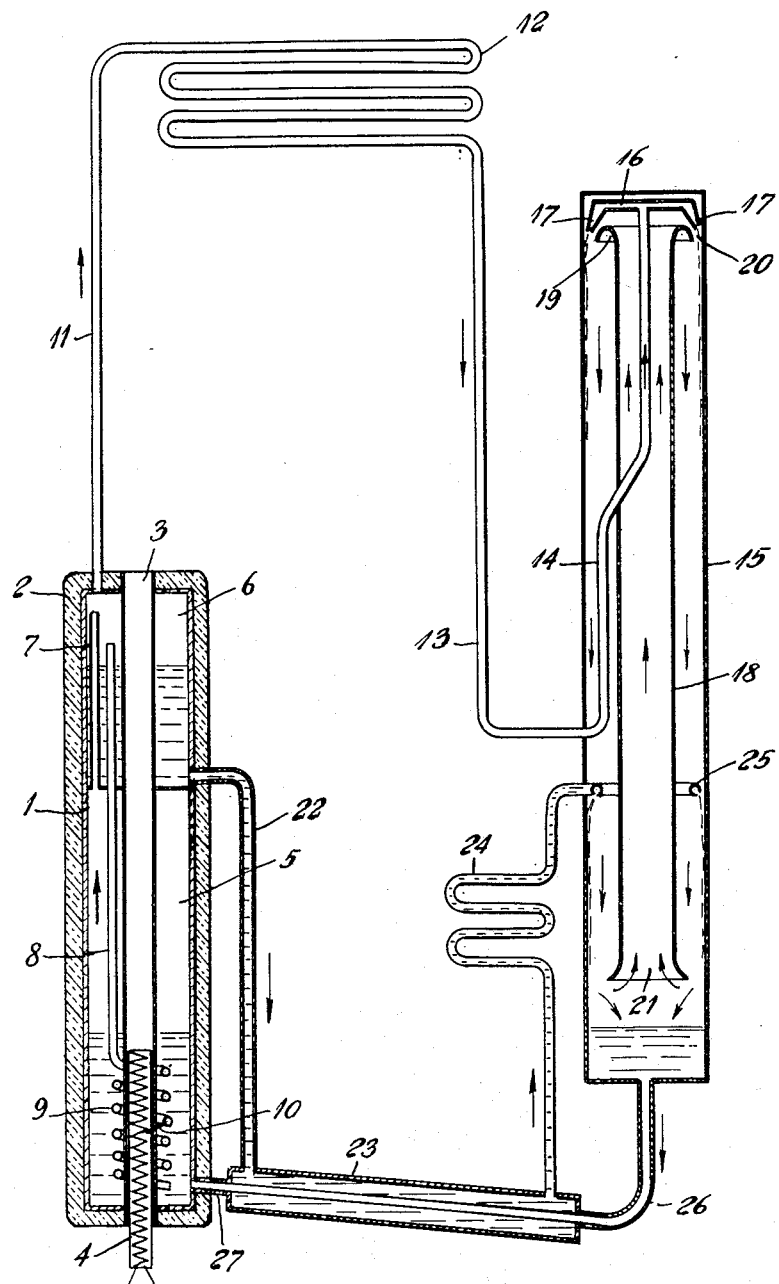
INVENTOR
Axel Uno Sarnmark.
BY
Cameron, Kerkam + Sutton.
ATTORNEYS.

Patented Apr. 17, 1934

1,955,345

UNITED STATES PATENT OFFICE 1,955,345

ABSORPTION REFRIGERATING MACHINE

Axel Uno Särnmark, Gottenborg, Sweden

Application May 12, 1931, Serial No. 536,855
In Sweden May 13, 1930

16 Claims. (Cl. 62—179)

The present invention is for improvements in and relating to absorption refrigerating machines and mediums for use in such machines.

One of the types of machines used in the production of cold is the absorption refrigerating machine. This machine is provided with a generator or evaporator containing a mixture of cooling medium and absorption medium. The generator is heated so that the cooling medium is driven off. The gasified cooling medium passes from the generator to a condenser, where it is cooled and condensed to a liquid, which is conveyed to a refrigerator.

In discontinuous machines of this type the heat supply to the generator is stopped when a certain amount of the cooling medium has passed from the generator to the refrigerator, and the generator with its content of absorption medium is then cooled. The cooling medium in the refrigerator evaporates owing to the lower pressure caused by the cooling and is absorbed by the absorption medium in the generator, which now acts as absorber, thus abstracting heat in the refrigerator.

This heat is taken from the surroundings of the refrigerator or the room which is to be cooled. The cooling medium having been absorbed by the absorption medium, the cooling of the generator is stopped and heat is supplied, so that the cooling medium in the generator is again driven off. The cycle is then repeated.

In continuously working absorption refrigerating machines the cooling medium is driven off as above from the mixture of cooling medium and absorption medium in the generator, condensed in a condenser and passed in the liquid state to the refrigerator where it evaporates under abstraction of heat, thereby causing a lowering of the temperature. The cooling medium thus evaporated passes to an absorber, where it is absorbed by poor absorption medium flowing from the generator to the absorber, thereby concentrating the absorption medium. The concentrated absorption medium is then returned to the generator, where the cooling medium is again driven off into the condenser and so forth. The poor absorption medium from which the cooling medium has been expelled, is returned to the absorber, where it is again concentrated.

When the cooling medium is condensed at the cooling temperature of the condenser it has a pressure which is determined by the medium itself and the temperature of condensation, and when the same cooling medium is evaporated in the refrigerator at the temperature thereof it has a pressure corresponding to the temperature of the refrigerator. Also in the absorber the pressure is determined by the temperature. Thus in the continuous absorption refrigerating machine the cooling medium gas in different parts of the apparatus has different pressures corresponding to the temperatures prevailing in the different parts of the machine. The differences in pressure may be maintained by means of force pumps and valves. As a rule, however, the pressure is balanced out by means of a circulating inert gas, for example hydrogen, introduced into the system, or by means of gas and liquid column pressure, obtained by disposing different parts of the machine at different levels, or by a combination of these methods.

In the absorption refrigerating machines hitherto known ammonia has been used as cooling medium and water as absorption medium.

As refrigerating machines are to be used under the conditions of atmospheric pressures and maximum temperatures prevailing on the earth, it is evident that the said substances in fact are very unsuitable. If the cooling water generally used for the condenser has a temperature of about 20–30° C. the pressure in the condenser and consequently in the whole system will be about 12–16 atmospheres. This pressure is counter-balanced only by the external atmospheric pressure, and thus the refrigerating machine must be made of very thick material. In spite of this there is always a serious risk of an explosion. As cooling water in some cases can be obtained only with difficulty and may be expensive, it may be necessary to use air cooling; the pressure in the apparatus will then be still higher and consequently the machine more expensive and the risk greater.

When ammonia is used as cooling medium and water as absorption medium, water is also evaporated with and accompanies the ammonia driven off from the generator. This is a great disadvantage in that the efficiency of the refrigerator is considerably reduced and more heat energy consumed; in addition discontinuous machines cease to work after a certain time owing to collection of water in the refrigerator.

In order to eliminate to some extent the disadvantages accompanying the evaporation of the water attempts have been made to separate the water by cooling in a dephlegmator and return it to the generator. This, however, causes great losses.

Firstly the latent heat of the evaporated water is lost in the dephlegmator.

Secondly a part of the ammonia driven off from the generator is again absorbed by the separated water in the dephlegmator, the latent heat of the ammonia thus returned being lost.

A further condition for the proper working of a continuous system at varying cooling water temperatures is that the cooling of the dephlegmator can be varied, and this can be attained only by cold produced in the refrigerator. Such cold, however, means consumption of heat and thus energy is lost also here, this being the third cause of reduced efficiency.

Fourthly, in spite of the dephlegmator some water always enters the refrigerator, reducing the efficiency. In addition the dephlegmator increases the cost of the machine.

Owing to the great thickness of material required when ammonia is used, the heat transmission in the generator, the condenser, the refrigerator, the absorber and above all the temperature exchanger is very poor. This is the fifth cause of reduced efficiency.

A further disadvantage of using ammonia as cooling medium is that hardly any other material than iron can be used in the machine. Other metals corrode and even iron is hardly sufficiently resistant, particularly if containing certain impurities. Further, iron or the thickness of 4 mms or more required owing to the high pressure is expensive and difficult to work and weld; in addition hydrogen when introduced into a continuous machine as inert gas in time easily diffuses through the material or the weld-joints, at the high pressure required.

The present invention has for its object to eliminate all these disadvantages by using instead of ammonia and water as cooling and absorption mediums other and more suitable substances.

It has been found that the cooling medium and the absorption medium should be miscible in the liquid state in all proportions and that organic substances or mixtures of such substances having certain physical and chemical properties can be used with advantage as cooling and absorption mediums.

The cooling medium should preferably be an easily volatile substance, preferably one having a boiling point at atmospheric pressure above 0° C. Cooling mediums having a boiling point between 15–45° or 20–40° C., corresponding to normal air and cooling temperatures, are particularly suitable in that the pressure within the refrigerating machine will be about one atmosphere, thus corresponding to the conditions prevailing on the earth. On the other hand, cooling mediums having a higher boiling point may be used, for example substances having boiling points between that of ammonia and ethyl alcohol.

Suitable absorption mediums are substances having a higher boiling point than the cooling medium, preferably above 100° C. at atmospheric pressure.

The invention also comprises suitable combinations of cooling and absorption mediums, with or without the addition of other substances. Suitable combinations are obtained when the substances employed are such that the cooling medium is rapidly absorbed in the absorption medium. If the absorption is too slow the effect of the refrigerating machine will be unsatisfactory.

According to the invention the cooling mediums are therefore preferably combined with such absorption mediums and in such proportions, that the vapour tension of the mixture of cooling medium and absorption medium in the absorber increases proportionally to the increase of the dilution of the absorption medium by the cooling medium, i. e. corresponding to a straight vapour tension curve or at first less than proportionally to the said dilution, i. e. with a vapour tension curve below the straight curve, the dilution of the absorption medium by the cooling medium being understood to mean the increase of the weight, volume or molecular concentration of the cooling medium in the mixture of absorption medium and cooling medium, all at the temperature of the absorber.

It has also been found that the partial vapour tension of the cooling medium when mixed with the absorption medium should preferably be less than or equal to what it should be according to Raoult's law.

The cooling medium may comprise a mixture of substances having different boiling points in order to obtain the desired boiling or condensation temperatures. Such mixtures may be binary, ternary or quarternary mixtures or mixtures of any desired number of substances. Preferably the vapour tension of the cooling medium mixture should be greater than or equal to the sum of the products obtained when the vapor pressure of each cooling medium in the mixture is multiplied by the weight, volume or molecular concentration of each cooling medium in the mixture, all vapour pressures at the same temperature. By using a mixture of different substances it is also possible to regulate for example the specific gravity of the vapours or the condensate, the latent heat of evaporation etc.

Suitable cooling mediums are substances belonging to one of the following groups of substances: hydrocarbons or halogen derivatives thereof, alcohols, aldehydes, ketones, oxy-compounds, ethers, esters, for example esters of monovalent or bivalent alcohols having one to three carbon atoms, mercaptanes, halogen derivatives of acids, nitriles, amines, substitution derivatives of such substances or a mixture of any two or more of such substances or derivatives thereof, with or without the addition of other substances.

As specific examples of such suitable cooling mediums may be mentioned the following substances: carbon disulphide, ethyl ether, glycol ether, methyl formate, ethyl bromide, methylene chloride, methylol, acetaldehyde, acetone, ethylen oxide, methyl acetate, ethyl nitrite, ethyl mercaptane, methyl mercaptane, methyl sulphide, ethyl phosphine, monochlor propylene, chlor methyl, methyl ether, chlor ethyl petroleum ether, acetyl chloride, acetyl fluoride, ethyl amine, ethylidene chloride, alyl chloride, ethyl formate diethyl amine, dimethyl amine, trimethyl amine, dimethyl keton, vinyl bromide, methylene fluoride, methyl fluoride, methyl bromide, ethyl fluoride, propyl fluoride, propyl chloride, ethylene fluoride, ethylidene fluoride, or substitution derivatives thereof or a mixture of any two or more of such substances or derivatives thereof, with or without the addition of other substances.

Suitable absorption mediums are substances belonging to one of the following groups of substances: hydrocarbons or halogen, oxide, nitro or sulphur derivatives thereof, mercaptanes, esters, alcohols, phenols, aldehydes, ketones, carbon acids, oxides, sulphides, ethers, alcohol esters, amines, higher amines or aromatic amines, anilines, phosphites, phosphates, or silicates of phenols, aromatic nitro compounds, chloranisols, acetates, phenol esters, or substitution derivatives of such substances or a mixture of any two or more of such substances or derivatives thereof, with or without the addition of other substances.

As specific examples of such suitable absorption mediums may be mentioned the following substances: monochlor naphthalene, monobrom naphthalene, dichlor naphthalene, trichlor benzene, diethyl sulphate, dichlor hydrin, dichlor isopropyl acetate, aniline, benzyl aniline, diethyl toluidene, triphenyl phosphite, tricresyl phosphate, tetracresyl silicate, tetraphenyl silicate, diethyl aniline, nitro benzene, orto and para nitro toluol, terpineol, benzaldehyde, salicyl aldehyde, salicylic acid methyl ester, benzol chloride, eugenol, amyl valeriate, diphenyl oxide, triacetine, acetophenone, æther, benzonic, æther œnathic, ethylene glycol diacetic, aldehyde cinnamylic, amylium valerianic, anethol, benzylium acetic, guaiacol carbonic, methyl hexalin, œnanthol, phenol carbonic, phenyl acetate, safrol, phenyl mustard oil, benzonitrile, o-anisidine, guaiacol, monochlor phenol, dichlor phenol, dichlor phenyl methyl ether, dichlor phenyl acetate, trichlor phenol, trichlor phenyl acetate, trichlor phenyl butyric acid, triphenyl phosphite dichloride, diphenyl phosphoric acid chloride, phenyl formate, o-nitro phenyl methyl ether, o-nitro phenyl ethyl ether, diphenyl sulphide, methylene anisole, ethenyl amino phenol, nitro cresyl ethyl ether, thiophenyl acetate, ethyl laurinate-myristinate, ethyl palmitate, ethoxyl acetic acid, ethyl trichlor lactate, nitro benzene, nitro toluol, or substitution derivatives thereof or a mixture of any two or more of such substances or derivatives thereof, with or without the addition of other substances.

The absorption medium may also be a fat or an oil, including mineral or ethereal oils, or a mixture of two or more fats or oils.

It is not necessary that the absorption medium should be a liquid; it may also be a normally solid substance.

The invention also comprises any combination of two or more of the above cooling and absorption mediums. As a preferred embodiment of such a mixture may be mentioned a ternary mixture, the cooling medium comprising carbon disulphide methyl formate and the absorption medium nitro benzol.

The absorption refrigerating machine may be of the discontinuous, periodic or continuous type.

If the condenser of the refrigerating machine is worked at a temperature of about 20-50° C. the cooling medium gas is condensed in the condenser at a pressure equal to or somewhat below or above the atmospheric pressure. The refrigeration machine, including all the various parts thereof, is thus subjected only to a very small pressure difference or at best to no pressure at all, and thus the whole machine with all its parts may be made of thin and inexpensive material which is easy to work. In addition there are other advantages.

Thus the generator may be made of material having a thickness of less than 4 mms, provided that it is designed with due regard to the pressure difference it has to withstand and to other stresses. The invention thus provides for a cheap construction of the generator and in addition the heat transmission from the heater to the liquid in the generator will be of a high order.

Also the refrigerator of the machine may be made of a material having a thickness less than 4 mms, but still with the necessary degree of safety to withstand the pressure and other stresses. The refrigerator can thus be made cheaply; at the same time increased heat transmission will be obtained from the cooling air surrounding the same to the cooling medium evaporating in the refrigerator, thus increasing the effect of the machine.

The condenser and the absorber are generally made in the form of containers or tube systems. According to the invention these parts are made of a material having a thickness which for containers is less than 4 mms and for tube systems less than 3 mms, at the same time sufficiently strong to withstand the pressure in the condenser respectively in the absorber, or other stresses, thus improving the efficiency of the condenser as well as the absorber. In addition to the cheaper construction the effect of the refrigerating machine is increased as a result of the more efficient condenser and absorber cooling.

In order to increase the efficiency of refrigerating machines, temperature exchangers are as a rule provided between the generator and the absorber as well as between the refrigerator on the one hand and the absorber and the condenser on the other. A necessary condition for a satisfactory temperature exchange is that the heat transmission in the same is of a high order. According to the invention all the temperature exchangers (or part thereof) and all conduits (or part thereof) are made of a material having a thickness for containers of less than 4 mms and for tube systems or conduits of less than 3 mms; at the same time sufficiently strong to withstand the pressure in the refrigerating machine, or other stresses. The use of this thin material greatly facilitates the heat transmission in the exchangers, whereby the efficiency of these as well as that of the whole refrigerating machine is increased. In addition they are cheap to produce.

By choosing cooling mediums having a boiling point at atmospheric pressure above 0° C., particularly mediums which boil at about 20-40° C., it is possible to construct the condenser and the absorber so that they may be cooled with air only and without developing too great a pressure in the same. According to the invention the condenser and the absorber in this case are made with cooling surfaces which are sufficiently large to provide for good condensation and absorption of the cooling medium with the aid of the surrounding air only.

With this object in view the condenser may be constructed as a coiled tube or as several tubes connected in parallel or as one or several containers; in all cases additional cooling flanges or fins may be provided if required. According to the invention the absorber may preferably be made as a round or flat container and may be provided with folds, corrugations or cooling fins.

It has already been stated that suitable absorption mediums are substances having boiling points above 100° C. When using a combination of cooling and absorption mediums according to the invention it is possible to drive off the cooling medium from the generator without also driving off any absorption medium or any substantial part thereof. The dephlegmators hitherto used for separating the absorption medium from the cooling medium are thus superfluous. Attention has also been drawn to the losses of energy which necessarily occur in a dephlegmator and which are further increased by the fact that the dephlegmator in order to work automatically must be cooled by cold produced in the refrigerator itself. A refrigerating machine in which the absorption liquid does not accompany the cooling medium in the evaporation of the latter from the generator must thus have a considerably higher efficiency than the machines heretobefore used. According to the invention and assuming that suitable cooling and absorption mediums are used, the condenser of the refrigerating machine may be connected by means of a conduit and without a dephlegmator directly with the generator. The invention thus provides for a simple and inexpensive construction and in addition the refrigerating machine will have a higher efficiency.

When ammonia is used as cooling medium the refrigerator must be made of iron, and the greater thickness of the material necessitated by the high internal pressure renders it impossible to produce the various parts of the machine by cold stamping, whereas the combinations of cooling and absorption mediums used according to the present invention permit the use of other metals than ordinary iron, such as for example rustless iron or steel, copper, nickel, zinc, tin, aluminium or lead, either as such or alloyed, as for example brass, or other materials as celluloid and the like. The various parts of the refrigerating machine, as generator, refrigerator, temperature exchanger etc. may thus be produced by simple and inexpensive pressing and drawing from relatively thin material. The various parts of the apparatus such as generator, refrigerator absorber, temperature exchanger, conduits etc. may be joined by welding, soldering or glueing.

Glass, silica or similar materials may also be used in the construction of the machine.

Heat from any source of energy, for example electricity, gas, solid or liquid combustible substances, or hot gases or liquids of any kind, may be used for working the machine. When the desired temperature has been reached in the room or rooms to be cooled the heat source or heat sources may be disconnected by means of a thermo-regulator in connection with the said rooms.

According to the invention the refrigerating machine may also work with a pressure-equalizing or balancing auxiliary medium. Such auxiliary mediums are used in absorption refrigerating machines of other kinds and in certain types of discontinuous or periodic systems. Hydrogen and methane have been proposed as suitable auxiliary mediums. According to the invention helium or other gases may be used. These have the following advantages:

(1) Helium is a very light and mobile gas and weighs only 1.98 times as much as hydrogen.

(2) Contrary to hydrogen helium is a non-combustible gas.

(3) Helium, which is a rare gas, is contrary to hydrogen, completely indifferent or chemically inert, i. e. can not unite with any other substance.

(4) Helium gas is less soluble in water than hydrogen and is, contrary to the later, insoluble in organic substances, which is of great advantage.

(5) Helium is not absorbed by any metals and thus does not diffuse through metals. This is a very valuable property; hydrogen on the other hand diffuses very easily even through metal walls of considerable thickness.

In addition to helium which may now be obtained at a reasonable price, also the other rare gases may be used, for example argon, xenon, crypton or neon. Xenon is the densest of all gases and may consequently be used with advantage in such refrigerating machines, in which the absorber is on a higher level than the refrigerator. Helium as well as the other rare gases referred to may be used separately or in mixtures, also admixed with other substances.

The order in which the said gases may be arranged in respect of their density is: hydrogen, helium, methane, neon, argon, crypton, xenon.

In the accompanying drawing is shown an absorption refrigerating machine which may be employed for carrying the invention into effect.

1 denotes the generator surrounded by the heat insulation 2. The generator is provided with a channel 3 passing through the same, preferably a tube or the like. In the lower part of the heat channel 3 is a heat source, in the figure shown as an electric heater 4, which preferably is arranged to be used with various voltages or which can be regulated in such a manner that the effect can be varied and consequently the speed of the freezing altered. Instead of the electric heater 4 any heat source may be employed, for instance burners for gases or liquid substances, in which case the combustion gases pass upwards through the heat channel 3; they may then, before they pass out, be brought into contact with the outer sides of the generator. When an electric heater is employed, the upper part of the channel 3 is covered by a lid.

The generator is divided into two chambers, the lower chamber 5, and the upper level chamber 6. The upper part of the chamber 5 is by means of a pipe 7 connected with the upper part of the chamber 6, and further the lower chamber is connected with the chamber 6 by means of a liquid pump 8. The lower part of the liquid pump consists of a coil 9, surrounding the channel 3 and in direct heat conduction with the same. In the liquid pump is provided a member 10, preferably a wire or the like, having good heat-conductibility and in direct heat connection with the heater 4 on the one hand and the internal free space of the pump on the other hand. The heat conducting member 10, the wire or the like, is preferably made of copper, silver, platinum, etc. or suitable alloys.

The generator is further by means of a pipe 11 or the like connected with a condenser 12, which in the drawing is shown as a pipe bent in a coil or in any other suitable shape, and which, when air-cooling is used, has such a large surface that a satisfactory condensing effect is obtained by air-cooling only. The condenser 12 may also be cooled by a liquid by being surrounded by a moving or circulating liquid, for instance water.

By means of a downward pipe 13 and an upward pipe 14 the condenser 12 is connected with the cooling medium distributor 16 of the vessel or the combined refrigerator-absorber 15, the distributor preferably comprising one or several injection nozzles 17. The upper part of the refrigerator-absorber 15, the refrigerator, is by means of one or several pipes, partition walls or the like 18 connected with the lower part of the vessel 15, the absorber. The middle portion of the refrigerator-absorber respectively the corresponding middle portion of the pipe, the partition walls or the like 18 are provided with cooling or heat fins, channels, corrugations, folds or the like, so that a good heat exchange is obtained between the fluids passing through the refrigerator-absorber 15, i. e. the cold mixture of cooling medium vapours and auxiliary medium and the warmer auxiliary medium respectively the flowing cooling medium condensate returning to the refrigerator part.

The member (or members) 18 is at its upper part preferably formed with a disk 19 or the like, so that one or several injector slots 20 are obtained. The lower part 21 terminates at a suitable height, so that a good return of the auxiliary medium is possible.

Further, the lower part of the level chamber 6 of the generator 1 is by means of a conduit 22, a temperature exchanger 23 and another pipe 24 connected with a liquid distributor 25 disposed in the lower part of the refrigerator-absorber and on a lower level than the chamber 6. The pipe 24 is wound in a coil or any other suitable shape in order to provide for a satisfactory air-cooling of the same. The bottom part of the refrigerator-absorber is by means of a pipe 26 connected with the heat-exchanger 23, and by means of the pipe extension 27 with the lower part of the generator 1. The temperature-exchanger 23, which in the form shown consists of two tubes, one inside the other, is preferably wound in a coil or any other suitable shape. In order to prevent heat losses the pipes 22, 26, 27 and the temperature exchanger 23 are preferably heat-insulated. The refrigerating machine also contains a suitable amount of a cooling medium and absorption medium, for instance a suitable organic substance and a suitable absorption medium, and further a pressure balancing auxiliary medium, for instance an indifferent or inert gas, hydrogen or the like, with or without admixture of other substances.

The continuous refrigerator machine works as follows. When the generator is heated by the heater 4, the heat is conducted through the walls of the channel 3 to the mixture of the absorption and cooling medium in the generator, and directly to the liquid pump 8—9, the heat supply to the pump partly being concentrated through the member 10. The cooling medium, which is considerably more volatile than the absorption medium, is driven off by the heating, partly directly from the generator, leaving through the pipe 7, and partly in the pump, mainly at the heating member 10. In the pump the cooling medium is driven off in the form of gas bubbles and these bubbles convey the liquid in the pump as small columns of liquid to the upper level chamber 6, from which the poor absorption solution (absorption medium wholly or partly freed from cooling medium) flows off through the pipe 22, passes the temperature exchanger 23, rises in the pipe 24 and subsequently is distributed over absorption members or absorption surfaces provided in the lower part of the combined refrigerator-absorber, said members or surfaces constituting the lower inside walls of the vessel 15 or a part of these walls. By means of the heat concentration in the member 10 the liquid in the generator is quietly and reliably conveyed upwards. It is not necessary that the pump coil 9 is in direct heat contact with the heat channel 3; the essential part of the required heat supply to the pump may take place through the member 10, and a part of the pump may also be located outside of the generator.

Cooling medium vapours in the level chamber 6 leave through the pipe 11 and are condensed to a liquid in the condenser 12, whereafter the cooling medium condensate flows off through pipe 13. On account of the gaseous auxiliary medium introduced into the refrigerator machine, for instance hydrogen, having a suitable pressure, the condensation of the cooling medium vapours can take place in the condenser, which is considerably warmer than the upper part of the refrigerator-absorber.

As the condenser 12 is located on a higher level than the distributor 16, the cooling medium condensate coming from the pipe 13 rises in the pipe 14 and is distributed by the member 17 over the evaporation members provided in the upper part of the refrigerator-absorber. According to the invention these latter members preferably are the inner walls of the vessel, the required large surfaces being provided by means of corrugations or the like. In order that the cooling medium may spread more easily over the evaporation surfaces these are preferably sand-blasted or covered by a porous material. The upper part of the refrigerator absorbs heat from its surrounding, i. e. the chamber or chambers which are to be cooled, and expels the heat to the cooling medium flowing down to the evaporation surfaces, the cooling medium evaporating under abstraction of heat and lowering the temperature in the refrigerator. As the cooling medium takes up heat directly through the walls of the vessel, the transport of heat from the surrounding of the refrigerator to the down-flowing cooling medium will be very good. The difference in cooling medium pressure between the colder upper part of the refrigerator-absorber and the other warmer parts of the apparatus is balanced out by the auxiliary medium introduced. The evaporated cooling medium vapours mix with the auxiliary medium in the refrigerator-absorber 15, and the cold gas mixture is conveyed to the lower part of the vessel 15, where it meets the poor absorption solution flowing over the absorption surfaces. The cooling medium vapours are now absorbed by the absorption medium, which is thus concentrated. The liberated auxiliary medium is returned to the upper part of the vessel 15 through the member or members 18, where it again mixes with the evaporated cooling medium vapours. The gas mixture is again conveyed to the lower part, and the cycle is repeated. The said absorption members or absorption surfaces are preferably constructed and arranged in the same manner as the previously described upper evaporation surfaces. The concentrated absorption solution passes through the pipe 26, the temperature exchanger 23 and the pipe 27 to the lower part of the generator 1, from which it is again by the pump 8, 9 conveyed to the upper chamber 6. From here it passes off as a poor solution through the pipe 22, and the cycle is repeated. At the same time the re-expelled cooling medium leaves through the pipe 11.

The efficiency of the refrigerator machine is increased by the fact that warm and poor absorption solution leaving the generator through the pipe 22 in the temperature exchanger 23 exchanges temperature and heat with the concentrated but colder absorption solution coming from the refrigerator 15 through the pipe 26. The solution flowing through the pipe 24 in the direction of the arrow is further cooled in the said pipe before it by means of the distributor 25 is spread over the absorption surfaces. The absorption heat liberated in the absorption is given off either directly through the walls of the vessel to the surrounding air or to a flowing and circulating cooling liquid, for instance water.

The transference of the mixture of cooling medium vapours and auxiliary medium from the upper to the lower part of the vessel 15 respectively the return of the auxiliary medium to the upper part is effected partly by the mechanical shock or injector action of the cooling medium condensate on the auxiliary medium at or in the members 17 and the mechanical friction action on the same by cooling medium liquid and absorption solution flowing down the walls of the vessel, partly because the said mixture in itself is heavier than the auxiliary medium alone, and partly because the down-flowing auxiliary medium as a result of the cooling in the upper part has a greater specific density than the heated auxiliary medium returning from the lower part, which is warmer on account of the absorption. A heat and temperature exchange takes place in the middle portion of the vessel 15 between the cold gas mixture coming from the upper cold refrigerator part of the vessel 15, and the considerably warmer auxiliary medium returning to the upper part, respectively the flowing cooling medium condensate, and this exchange is considerably facilitated by the previously mentioned construction of the said middle portion respectively member 18. As the walls of and in the vessel 15 according to the invention may be made of very thin material, the detrimental transmission of heat from the lower warm part to the upper cold part through the material itself is to a large degree decreased. On account of the economical temperature exchange in the middle portion of the vessel 15, lower temperatures and a quicker ice formation in the freezing of water can further be obtained. To this end the refrigerator machine is provided, close to the refrigerator, with boxes or containers in which ice cubes can be produced.

It has already been mentioned that the absorption medium should be miscible with the cooling medium in all proportions. It is not necessary, but it may be desirable in some cases that the absorption medium when admixed with the cooling medium, at any pressure and proportions of mixture, should have a lower vapour tension than the cooling medium alone at a lower temperature than that of the mixture. The absorption medium may be such, that when admixed with the cooling medium, at a temperature at least 10° C. or 20° C. or more above that of the cooling medium, it has a lower temperature than the cooling medium alone.

The invention may be applied to all kinds of absorption refrigerating machines.

What I claim is:—

1. That improvement in the art of refrigerating through the agency of an absorption system including a generator, condenser and refrigerator connected to afford a cycle of circulation between them, which consists of expelling a cold producing medium containing carbon disulphide and methyl formate from a mixture with an absorption medium containing nitro benzol, in the generator, condensing the cold producing medium, and of then rapidly evaporating the liquid cold producing medium in the presence of an auxiliary gaseous medium.

2. That improvement in the art of refrigerating through the agency of an absorption system including a generator, condenser and refrigerator connected together to afford a cycle of circulation between them which consists in expelling a cold producing medium containing carbon disulphide and methylformate from a mixture with an absorption medium containing nitro benzol, in the generator, condensing the cold producing medium, and of then rapidly evaporating the liquid cold producing medium in the presence of an auxiliary gaseous medium such as hydrogen.

3. A group of cooperating substances for refrigeration consisting of a cold producing agent containing methyl formate and carbon disulphate and an absorption medium containing an organic nitro compound, said substances being miscible in the liquid state in all proportions.

4. A group of cooperating substances for refrigeration consisting of a cold producing agent containing methyl formate and carbon disulphate and an absorption medium containing an aromatic nitro compound, said substances being miscible in the liquid state in all proportions.

5. A group of cooperating substances for refrigeration consisting of a cold producing agent containing methyl formate and carbon disulphide, and an absorption medium, said substances being miscible in the liquid state in all proportions.

6. As a material for use in refrigeration, the group of cooperating substances consisting of a cold producing medium containing carbon disulphide and methyl formate and an absorption medium containing nitro benzol.

7. A group of cooperating substances for refrigeration containing an organic cold producing medium formed of a mixture of substances having a vapor tension greater than the vapor pressure which can be calculated from the vapor pressure of the constituents according to Raoult's law, an organic absorption medium miscible in all proportions of the cold producing medium in the liquid state, and a gas practically insoluble in organic substances for reducing the vapor pressure of the cold producing medium.

8. A group of cooperating substances for refrigeration consisting of a cold producing medium containing an organic substance in a mixture having a vapor tension greater than the vapor pressure which can be calculated from the vapor pressure of the constituents according to Raoult's law and having a boiling point within the range of 15° to 45° C. at substantially atmospheric pressure, and an absorption medium containing an organic substance of such character that the two mediums are miscible in the liquid state in all proportions, the characteristics of the media being such that the vapor tension of the cold producing medium admixed with the absorption medium is lower than the vapor pressure which corresponds to the concentration of the cold producing medium in the mixture according to Raoult's law.

9. A group of cooperating substances for refrigeration consisting of a cold producing medium containing an organic substance in a mixture having a vapor tension greater than the vapor pressure which can be calculated from the vapor pressure of the constituents according to Raoult's law and an absorption medium containing an organic substance and having a boiling point greater than 100° C., said media being miscible in the liquid state in all proportions and having characteristics such that the vapor tension of the cold producing medium admixed with the absorption medium is lower than the vapor pressure which corresponds to the concentration of the cold producing medium in the mixture according to Raoult's law.

10. A group of cooperating substances for refrigeration consisting of a cold producing medium containing an organic substance in a mixture having a vapor tension greater than the vapor pressure which can be calculated from the vapor pressure of the constituents according to Raoult's law and having a boiling point within the range of 15° to 45° C. at substantially atmospheric pressure, and an absorption medium containing an organic substance and having a boiling point greater than 100° C., the media being such that they are miscible in the liquid state in all proportions and the vapor tension of the cold producing medium admixed with the absorption medium is lower than the vapor pressure which corresponds to the concentration of the cold producing medium in the mixture according to Raoult's law.

11. A group of cooperating substances for refrigeration including a cold producing medium containing an organic substance in a mixture having a vapor tension greater than the vapor pressure which can be calculated from the vapor pressure of the constituents according to Raoult's law, an organic absorption medium, the cold producing medium being such that it is miscible in the absorption medium in all proportions in the liquid state, and a gas practically insoluble in organic substances for reducing the vapor pressure of the cold producing medium.

12. A group of cooperating substances for refrigeration containing a cold producing medium formed of a mixture of substances including an organic substance and having a vapor tension greater than the vapor pressure which can be calculated from the vapor pressure of the constituents according to Raoult's law, an absorption medium containing an organic substance and miscible in all proportions of the cold producing medium in the liquid state, and a gas practically insoluble in organic substances for reducing the vapor pressure of the cold producing medium.

13. A group of cooperating substances for refrigeration consisting of a cold producing medium formed of a mixture of substances and containing an organic substance and having a vapor tension greater than the vapor pressure which can be calculated from the vapor pressure of the constituents according to Raoult's law, an absorption medium containing an organic substance and miscible in all proportions of the cold producing medium in the liquid state, the characteristics of the media being such that the vapor tension of the cold producing medium admixed with the absorption medium is lower than the vapor pressure which corresponds to the concentration of the cold producing medium in the mixture according to Raoult's law.

14. A group of cooperating substances for refrigeration containing an organic cold producing medium formed of a mixture of substances having a vapor tension greater than the vapor pressure which can be calculated from the vapor pressure of the constituents according to Raoult's law and an organic absorption medium miscible in all proportions of the cold producing medium in the liquid state.

15. A group of cooperating substances for refrigeration including a cold producing medium containing an organic substance in a mixture having a vapor tension greater than the vapor pressure which can be calculated from the vapor pressure of the constituents according to Raoult's law and an organic absorption medium, the cold producing medium being such that it is miscible in the absorption medium in all proportions in the liquid state.

16. A group of cooperating substances for refrigeration containing a cold producing medium formed of a mixture of substances including an organic substance and having a vapor tension greater than the vapor pressure which can be calculated from the vapor pressure of the constituents according to Raoult's law and an absorption medium containing an organic substance and miscible in all proportions of the cold producing medium in the liquid state.

AXEL UNO SÄRNMARK.